United States Patent [19]

Burke et al.

[11] 4,202,600
[45] May 13, 1980

[54] DICED RETROREFLECTIVE SHEETING

[75] Inventors: Thomas F. Burke, Wayland; Donald H. Walker, Winchester, both of Mass.

[73] Assignee: Avery International Corporation, San Marino, Calif.

[21] Appl. No.: 899,311

[22] Filed: Apr. 24, 1978

[51] Int. Cl.² .................................. G02B 5/122
[52] U.S. Cl. ................................ 350/103; 350/97
[58] Field of Search ............... 428/172; 350/103, 104, 350/105, 106, 107, 108, 109, 129, 288, 162 R, 167; 350/103–105

[56] References Cited

U.S. PATENT DOCUMENTS

| | | | |
|---|---|---|---|
| 3,541,606 | 11/1970 | Heenan et al. | 350/103 |
| 3,684,348 | 8/1972 | Rowland | 350/103 |
| 3,712,706 | 1/1973 | Stamm | 350/103 |
| 3,810,804 | 5/1974 | Rowland | 350/109 |
| 3,873,184 | 3/1975 | Heenan et al. | 350/103 |
| 3,935,359 | 1/1976 | Rowland | 350/103 |
| 4,025,159 | 5/1977 | McGrath | 350/103 |

FOREIGN PATENT DOCUMENTS 398,647  9/1933  United Kingdom ............ 350/103

Primary Examiner—John K. Corbin
Assistant Examiner—B. Wm. de los Reyes
Attorney, Agent, or Firm—Christie, Parker & Hale

[57] ABSTRACT

Retroreflective sheeting having a plurality of retroreflective cube corner prisms distributed over one of its surfaces is described. The prisms are disposed in a planar array having a plurality of zones of prisms having differing angular orientations such that the zones have differing retroreflective brightness when illuminated by a light beam at a high angle of incidence. The zones are small enough to be substantially unresolvable by the unaided human eye at the expected viewing distances, so that the sheeting appears to have uniform retroreflective brightness when viewed at a high angle of incidence.

14 Claims, 8 Drawing Figures

DICED RETROREFLECTIVE SHEETING

BACKGROUND

The present invention relates to cube corner retroreflective sheeting, particularly to cellular retroreflective sheeting for use in the preparation of road markers and signs.

Cube corner retroreflective sheeting and methods for making such sheeting have been described in a number of patents. U.S. Pat. No. 3,684,348 to Rowland describes retroreflective sheeting in which a multiplicity of separately formed, minute cube corner formations having a side edge dimension of less than 0.025 inch are formed by molding the cube corner formations onto a plastic film that serves as the base for the retroreflective sheeting. U.S. Pat. No. 3,810,804 to Rowland describes a method for making such retroreflective sheeting by depositing on a molding surface having cube corner recesses a fluid molding material in an amount to fill the recesses. A pre-formed body member such as a plastic film is applied to the fluid-filled mold and the molding material is hardened and bonded to the body member. The above-mentioned Rowland patents are incorporated herein by this reference.

U.S. Pat. No. 3,712,706 to Stamm, which is incorporated herein by this reference, explains in excellent detail both the theory behind the retroreflective behavior of such cube corner sheeting and methods for forming such sheeting. Briefly, a carefully polished flat blank is ruled with a series of parallel closely spaced grooves using a diamond tool having a point shaped to a precise angle. A second set of parallel grooves is ruled at an angle of 120° to the first set, and a third set of grooves is ruled at an angle of 120° to each of the first two sets to produce minute cube corner prisms having equilateral triangular bases and arranged in an array having hexagonal symmetry. The ruled master is used to form a mold having an array of cube corner recesses. The mold is then used for casting or embossing a series of minute cube corner prisms onto a transparent base sheet. Light entering the base sheet through the side opposite the prisms is reflected within the prisms and directed back through the opposite side of the base sheet toward the source of light.

The intensity of the retroreflective beam from such sheeting is greatest when the incident beam has an angle of incidence of 0°, i.e., is normal to the plane of the reflective sheeting. At higher angles of incidence, e.g., at angles greater than about 30° from the normal, the brightness of the retroreflected beam is a function of the angle about an axis normal to the sheeting, called the azimuthal angle, at which the incident beam strikes the sheeting. When the angle of incidence of a light beam is held constant at a value of, for example, 60° from the normal and the azimuthal angle of the incident beam is varied from 0° to 360°, the intensity of the retroreflected beam varies. Rotation of such an array about an axis normal to the array through an angle of 30° produces the maximum difference in orientation of the prisms, whereas rotation through an angle of 60°, or any multiple thereof, produces no difference in effective orientation. A graph of the intensity on polar coordinates shows six maxima and six minima at 30° azimuthal intervals.

High retroreflectivity at high angles of incidence is an important characteristic for road signs. When a single large sheet of cube corner retroreflective material is to be used, for example, as the background of a sign, it is a relatively simple matter for the manufacturer of the sheeting to include on the sheet an indication of the proper orientation of the sheet for achieving maximum retroreflectivity at high angles of incidence in a plane roughly parallel to the ground. However, it is customary in sign-making practice to cut up the retroreflective sheeting for making letters and other indicia and for piecing together large backgrounds. Regardless of the orientation of individual pieces of sheeting used to make up the sign, at low angles of incidence the sign will appear uniformly bright. However, at high angles of incidence, some portions of the sign may be oriented to provide a retroreflected beam of higher intensity, and other portions of the sign may be oriented to provide a retroreflected beam of lower intensity. Such a sign would appear to an observer to have an uneven brightness which would at least be unattractive and which could be severe enough to obscure the indicia on the sign.

Thus, great care must be taken to maintain the orientation of the prisms on such retroreflective sheeting when pieces of the sheeting are used to make up signs. Because the individual prisms are so tiny, it can be difficult or impossible to maintain the orientation of the sheeting by visual inspection, and the utility of such sheeting to sign makers is diminished.

The retroreflective efficiency of the sheeting diminishes when the reflecting faces of the prisms become dirty or weathered. Cellular retroreflective sheeting has been described in which a cover sheet is supported in spaced relation to the prisms on a network of narrow intersecting ridges or septa. The cover sheet is sealed to the ridges, thereby providing a plurality of sealed cells, each cell containing a plurality of prisms which are protected within the cell from dirt and weathering. U.S. Pat. No. 4,025,159, which is incorporated herein by this reference, describes cellular retroreflective sheeting and methods for sealing the cover sheet to the network of ridges. For reasons of mechanical strength, simplicity and reflective efficiency, the cells are generally formed as close-packed, regular polygons, notably squares as illustrated in said U.S. Pat. No. 4,025,159. Retroreflective sheeting having such square cells can be oriented visually in either of two perpendicular directions by aligning the sides of the squares. Because the prisms are in an array having hexagonal symmetry, rotation of the entire array by 90 degrees, as would occur in the piecing together of a sign, can result in an effective angular displacement of 30° in the orientation of the prisms on one piece of sheeting with respect to the prisms on another piece of sheeting. Inasmuch as maxima and minima in retroreflective brightness occur at 30° intervals, such misorientation would result in some portions of the sign having maximum retroreflective efficiency in a horizontal plane and other portions of the sign having minimum retroreflective efficiency in the horizontal plane.

It would be desirable, therefore, to have cube corner retroreflective sheeting which could be cut up and pieced together to form a sign without regard for the orientation of the individual pieces.

SUMMARY OF THE INVENTION

The present invention provides retroreflective sheeting having a layer of cube corner retroreflective prisms distributed over one of its surfaces. The prisms are grouped in a plurality of zones, the prisms in one zone having differing azimuthal orientation from the prisms in an adjacent zone. The zones of prisms are of such small size as to be substantially unresolvable by the unaided human eye at the expected minimum viewing distance of the sheeting, so that the sheeting appears to have uniform retroreflective brightness when viewed from at least the minimum expected viewing distance.

In a preferred embodiment, the prisms are triangular based cube corner prisms disposed in an array having hexagonal symmetry, and the azimuthal angular displacement between adjacent zones is about 30°.

In another embodiment of the invention, cellular retroreflective sheeting having such angularly displaced arrays of triangular cube corner prisms is provided.

DETAILED DESCRIPTION OF THE INVENTION

Figure 1:
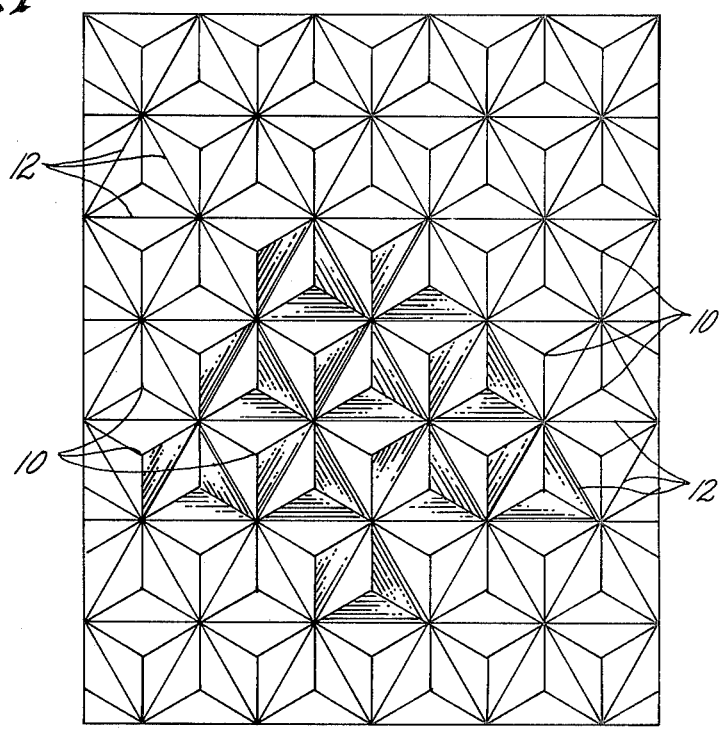
FIG. 1 illustrates triangular cube corner prisms in a planar array having hexagonal symmetry.
Figure 2:
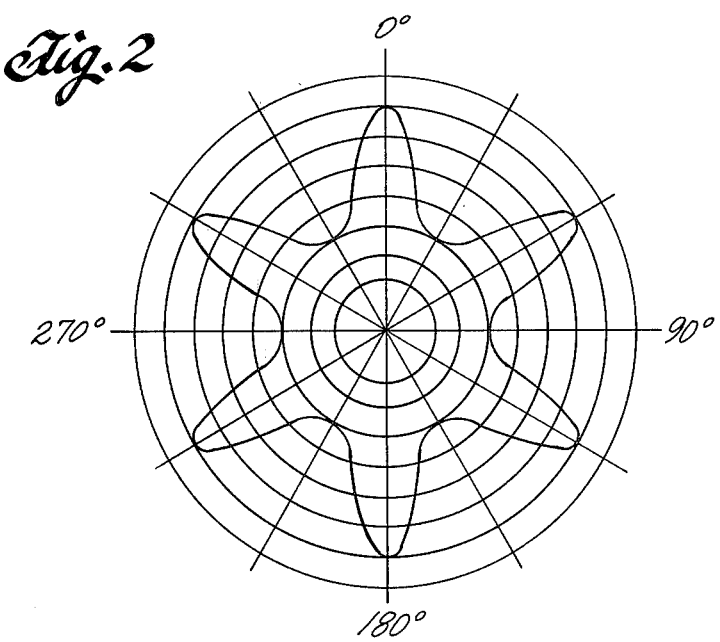
FIG. 2 is a graph in polar coordinates suggesting in exaggerated degree how the intensity of a retroreflected beam at high angles of incidence varies with the azimuthal angle of the beam for the array shown in FIG. 1.

Referring to FIG. 1, a section of retroreflective sheeting having an array of triangular based cube corner prisms is shown from the non-retroreflecting, prism side. The array has six sets of parallel planes of symmetry normal to the plane of the array. Three sets of planes of symmetry pass through the apices 10 of the prisms and three planes of symmetry pass through the valleys 12 between prisms which correspond to the ruled grooves of the engraved master. The projections on the plane of the array of two such planes of symmetry are indicated by dashed lines 32 and 36 in FIG. 3A. An incident beam of light striking the array at a high angle of incidence, such as an angle of 60° or 70°, from the base side (i.e. from behind the plane of FIG. 1), is retroreflected with an intensity that is related to the relative positions of the incident beam and the planes of symmetry of the array. FIG. 2 is an exaggerated plot on polar coordinates of the intensity of the retroreflected beam from such sheeting as a function of the azimuthal angle of the incident beam at a high angle of incidence. The maxima are spaced from the minima by 90°. It is readily apparent that a sign-maker piecing together a sign from pieces of such sheeting could place the material on the sign substrate in a variety of orientations, because the prisms are so small that there is no visual indication of the orientation of the prism arrays. For example, cellular sheeting having square cells could be oriented with equal probability in either of two perpendicular directions corresponding to alignment of the cell edges and, as a result, some piece of sheeting would appear brighter and some darker to an observer viewing the sheeting at a high angle of incidence.

Figure 3A:
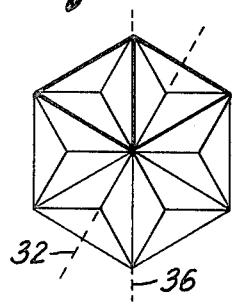
FIGS. 3A and 3B show two hexagonal arrays of cube corner prisms having orientations differing by an azimuthal angle of 30° and how such differing orientations can be achieved by rotating the entire array through 90°.
Figure 3B:
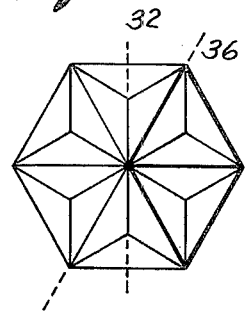

FIGS. 3A and 3B depicts two hexagonal arrays of prisms which are oriented with respect to one another in such a way that corresponding planes of symmetry, such as the planes indicated by dashed lines 32 and 36, intersect at an angle of 30°. The prism pairs within the bold outlines show that an angular displacement of 30° in the orientation of the planes of symmetry can be achieved by rotating the entire array through an angle of 90°, as would naturally occur if pieces of sheeting having square cells were assembled with care taken only to align the sides of the cells.

Figure 4:
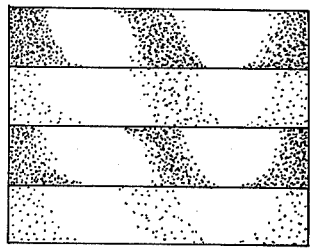
FIG. 4 shows a sign background made up of strips of misoriented cube corner retroreflective sheeting, showing how the background can appear to have non-uniform brightness when viewed at a high angle of incidence.

FIG. 4 shows a sign having a background or field made up of cellular retroreflective sheeting. Several strips of sheeting have been pieced together to make up the field of the sign but alternate strips have been rotated in orientation by 90°. When viewed at a high angle of incidence, such a sign would present the appearance of darker and lighter stripes as illustrated.

Figure 5:
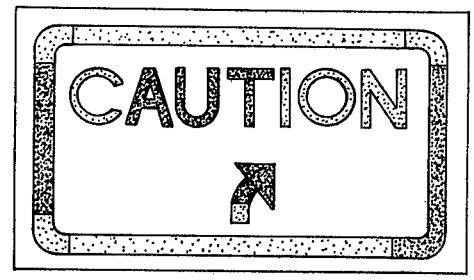
FIG. 5 shows how sign indicia made up of misoriented pieces of cube corner retroreflective sheeting can appear non-uniform and confusing when viewed at a high angle of incidence.

FIG. 5 illustrates the effect of cutting up cellular retroreflective sheeting to form indicia on a sign, the cut pieces of sheeting being oriented only with respect to the edges of the square cells while ignoring the orientation of the prisms within the cells. When viewed at a high angle of incidence, such a sign would present a confused appearance which could obscure the meaning of the indicia on the sign.

Retroreflective sheeting of the present invention overcomes the problems of such misorientation in the making of signs or indicia and the like. In accordance with this invention, the retroreflective sheeting has a plurality of small zones or regions of cube corner prisms of differing orientation distributed in a systematic or random pattern across the sheet. The zones or regions are small enough so that at the minimum expected viewing distance of the sheeting, which may be several hundred feet in the case of a highway sign, the individual zones are not resolvable by the unaided human eye. Each zone contains triangular cube corner prisms in an array having hexagonal symmetry, as illustrated in FIG. 1. The arrays in a portion of the zones are angularly displaced or rotated with respect to the arrays in another portion of the zones in such a way as to reduce the variation in retroreflective efficiency of the sheet as a whole as a function of the azimuthal angle of the incident beam. Although at a given azimuthal angle, some of the zones or regions appear darker and some lighter, the eye perceives only the average brightness of the sheet because the zones are too small to be individually visible at the minimum expected viewing distance.

Retroreflective sheeting of the present invention may be cellular or non-cellular, may include reflective coatings on the prism faces, and may include additional layers such as colored layers, weather-protective layers, adhesive layers spread over the prisms side of the sheeting, and the like as taught in the prior art.

The zones or regions of prisms may be of any desired shape such as square, round, hexagonal, equilateral triangular, right triangular, rectangular, pentagonal and the like. For clarity and ease of understanding, the present invention will be described in detail in terms of cellular retroreflective sheeting having square cells in which the arrays of prisms in alternate cells are angularly displaced by 30°, i.e., have orientations differing by 30° as shown in FIG. 3.

Figure 6:
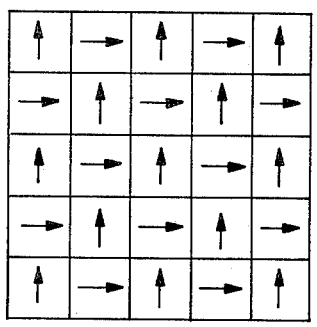
FIG. 6 schematically illustrates cellular retroreflective sheeting having square cells in which the arrays of prisms in alternate cells are angularly displaced by 30° as indicated by the vertical and horizontal double-headed arrows.
Figure 7:
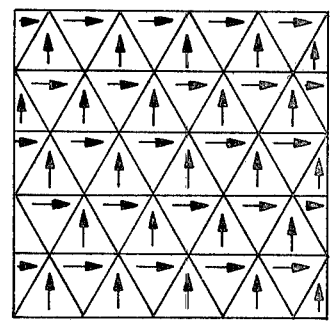
FIG. 7 illustrates sheeting of this invention having triangular cells.

Referring to FIG. 6, such retroreflective sheeting is schematically illustrated. The cells having a horizontal arrow include an array of prisms having the orientation of the hexagonal array in FIG. 3A. The cells having a vertical arrow have arrays of prisms having the orientation of the hexagonal array in FIG. 3B. When viewed by retroreflected light at close range, i.e., at a distance less than the minimum expected viewing distance, such sheeting may present a checkerboard appearance of alternating lighter and darker squares, but when the sheeting is viewed at a sufficient distance, the unaided eye is unable to resolve the individual squares and the sheet appears to have uniform brightness.

The cube corner prisms each have three planar faces which were disposed in planes perpendicular to each other and intersecting along the side edges. The apex of each prism is vertically aligned with the center of the base. The cube corner prisms are arranged in a pattern providing rows and columns and the center to center spacing between the apices of the cube corner prisms along the rows and columns is such as to insure close spacing of the prisms and to substantially avoid any flat areas between the rows of prisms. The cube corner prisms may have a side edge dimension of up to about 0.025 inch, preferably less than about 0.01 inch, for example, 0.004 to 0.008 inch.

The useable dimensions of the zones or regions of retroreflective elements can vary over a wide range depending upon the size of the prisms within the cells and upon the minimum expected viewing distance. If the cells are excessively small, the proportion of the surface area of the sheeting occupied by complete triangular cube corner prisms is excessively diminished and the overall brightness of the sheet suffers.

The dimensions of the cells should be sufficient to include several complete cube corner prisms, preferably at least one full hexagonal array of six cube corner prisms. The maximum dimension of the cell is related to the expected viewing distance and the resolving power of the human eye at such a distance. Thus for example the edge dimension of a square cell can vary from about 0.05 to about 0.5 inch, for example, from about 0.1 to about 0.3 inch. When the cells are small relative to the expected viewing distance, a group of adjacent cells, such as a strip of 2 or a square cluster of 4, may be small enough to be unresolvable with the unaided eye at the minimum expected viewing distance. In such a case, the cells in such groups may have arrays of prisms having the same orientation and the cells of adjacent groups may have arrays of prisms of a different orientation, so long as the differences in orientation are not discernable at the minimum expected viewing distance.

Round or equilateral polygonal zones such as triangular, hexagonal, or square zones can have a maximum edge, diagonal, or diameter, whichever is greater, in the range of about 0.05 to 0.5 inch, for example from about 0.1 to 0.3 inch. Zones that are longer than they are wide, or zones that have complex or randomly varied shape can have a maximum dimension greater than 1 inch provided the zones on the sheet are not resolvable by the unaided human eye at the minimum expected viewing distance.

The orientations of the arrays of prisms can be varied in a regularly alternating pattern, such as a checkerboard pattern, in a random pattern, or in any other pattern that provides sufficient mixing of differing orientations to give the sheet an appearance of uniform brightness when viewed at a high angle of incidence from the minimum expected viewing distance.

The sheeting may be made by any method disclosed in the art, such as methods described in U.S. Pat. Nos. 3,810,804, 3,712,706, and 4,025,159, which are incorporated herein by this reference. Briefly, the prisms are cast or embossed onto the surface of a transparent carrier sheet such as a flexible plastic film with a casting or embossing mold. The ridges that form the sides of the cells can be formed in place when the prisms are formed or can be formed afterward by techniques such as thermoforming, or by bonding a mesh of thermoplastic material to the sheeting. A cover film is then bonded to the ridges to form hermetically sealed cells that protect the reflective faces of the prisms from dirt and weathering.

The proper construction of the mold is important in practice of this invention. As described above, molds for cube corner retroreflective sheeting have been made in the past by ruling a flat, polished metal plate master, such as a steel or aluminum master, in such a way as to form closely spaced triangular-based cube corner prisms in an ordered array having uniform orientation. The master is then used to form a mold having cube corner recesses by a replication technique such as electroplating. To save the cost of ruling a large master, a number of molds may be formed from the master and assembled edge to edge for molding sections of sheeting larger than the master.

For use in practice of this invention, the ruled master or a mold formed thereon can be cut up into pieces corresponding in size and shape to the zones of prisms of differing orientation which are desired in the retroreflective sheeting to be made with the mold. Thus, for example, the mold can be cut into squares, rectangles, triangles, hexagons, or the like.

The pieces are then reassembled in a pattern that will produce retroreflective sheeting having the desired zones of differing orientation. When the pieces are square, alternate pieces in the rows and columns are rotated by 90 degrees. Because the ordered arrays have hexagonal symmetry, rotation of an array about an axis normal to the plane of the array by 60 degrees or any multiple thereof effects no net change in orientation, whereas a rotation of 90 degrees produces a net rotation of 30 degrees (90 minus 60) and effects the greatest difference in orientation.

Shapes such as equilateral triangles or hexagons can only be rotated in place by multiples of 60 degrees, so that no net change of orientation is effected by such rotation. When such shapes are used, two molds are cut up to produce pieces having orientations differing by a desired angle, such as 30 degrees, and the pieces from the two molds are interspersed and reassembled to form a mold having zones of prisms having differing orientations.

In a preferred method for producing molds for use in practice of this invention, a number of steel pins having square cross sections are clamped side by side in a frame, corresponding ends of the pins being aligned to form a flat surface. The flat surface formed by the ends of the pins is polished flat and is ruled to form the prisms as if it were a flat metal plate. The frame is then loosened, alternate pins having prisms ruled on one end thereof are lifted from the group, rotated 90 degrees, and replaced. The ends of the pins having the prisms are carefully aligned and the frame is tightened. The ruled master thus formed has a plurality of zones of prisms, each zone corresponding to the ruled end of one steel pin. The master is then used to form molds by any known technique. Pins of other cross-sectional shape which can be fitted together without gaps, such as triangular or hexagonal pins, may be used instead of square pins.

One pin of the group corresponds to one zone of differing orientation of the retroreflective sheeting. There is no necessary relation between the zones and the cells. A zone may correspond to one cell of cellular sheeting, or may include several cells, such as a square group of four cells, or may cover only a part of a cell.

When the ruled pins are removed, rotated, and replaced, prisms at the edges of the pins are disrupted and lose their retroreflective character. To minimize further loss of prisms, ridges defining the cells in cellular sheeting of this invention preferably coincide with the pin edges. After a mold is formed from the master, grooves are cut into the mold along lines corresponding to the pin edges. Such a mold produces sheeting having ridges formed in place, requiring only the addition of a cover film to produce sealed cellular sheeting.

Although the present invention has been described with reference to particular details and embodiments thereof, the particulars of the description are not intended to limit the invention, the scope of which is defined in the following claims:

What is claimed is:

1. In cube-corner retroreflective sheeting comprising a carrier sheet having a layer of cube corner retroreflective prisms disposed over one of its surfaces, the improvement wherein:
   the sheeting comprises a plurality of zones of prisms, the prisms being disposed in an ordered array within each zone, the arrays of prisms in adjacent zones having differing azimuthal orientation, whereby adjacent zones have differing retroreflective brightness at high angles of incidence of an incident light beam, and
   the zones of prisms have a size such that they are not visually resolvable by the unaided human eye at a minimum expected viewing distance, whereby the sheeting presents an appearance of uniform brightness to the eye when viewed at a high angle of incidence by retroreflected light from a distance of at least the minimum expected viewing distance.

2. The sheeting of claim 1 wherein the prisms have equilateral triangular bases and are disposed in arrays having hexagonal symmetry, and the orientation of arrays in adjacent zones differs by an azimuthal angle of about 30 degrees.

3. The sheeting of claim 1 wherein the zones of prisms are square and have an edge dimension of from about 0.05 to 0.5 inch.

4. The sheeting of claim 3 in which the edge dimension is from about 0.1 to about 0.3 inch.

5. In cellular cube corner retroreflective sheeting having a carrier sheet, a layer of triangular-based cube corner prisms and a network of intersecting ridges defining cells disposed over one of its surfaces, and a cover film bonded to the ridges for sealing the prisms within the cells, the prisms being disposed in an ordered array within each cell, the improvement wherein
   the sheeting comprises a plurality of zones of prisms, the arrays of prisms in adjacent zones having differing azimuthal orientation, whereby adjacent zones have differing retroreflective brightness at high angles of incidence of an incident light beam, and
   the zones have a size such that they are not visually resolvable by the unaided human eye at a minimum expected viewing distance, whereby the sheeting presents an appearance of uniform brightness to the eye when viewed at a high angle of incidence by retroreflected light from a distance of at least the minimum expected viewing distance.

6. The sheeting of claim 5 wherein each zone of prisms includes a plurality of cells.

7. The sheeting of claim 5 wherein each zone of prisms corresponds to one cell.

8. The sheeting of claim 7 in which the cells are square, the arrays of prisms in the cells have hexagonal symmetry, and the arrays in alternate cells have orientations differing by an azimuthal angle of about 30 degrees.

9. In a retroreflective marker, sign, or the like comprising cube corner retroreflective sheeting, the sheeting comprising a carrier sheet having a layer of cube corner retroreflective prisms disposed over one of its surfaces, the improvement wherein:
   the sheeting comprises a plurality of zones of prisms, the prisms being disposed in an ordered array within each zone, the arrays of prisms in adjacent zones having differing azimuthal orientation, whereby adjacent zones have differing retroreflective brightness at high angles of incidence of an incident light beam, and
   the zones of prisms have a size such that they are not visually resolvable by the unaided human eye at a minimum expected viewing distance, whereby the sheeting presents an appearance of uniform brightness to the eye when viewed at a high angle of incidence by retroreflected light from a distance of at least the minimum expected viewing distance.

10. The retroreflective marker of claim 9 wherein the prisms have equilateral triangular bases and are disposed in arrays having hexagonal symmetry, and the orientation of arrays in adjacent zones differs by an azimuthal angle of about 30 degrees.

11. The retroreflective marker of claim 9 wherein the zones of prisms are square and have an edge dimension of from about 0.05 to 0.5 inch.

12. The retroreflective marker of claim 9 in which the edge dimension is from about 0.1 to about 0.3 inch.

13. The retroreflective marker further comprising a network of intersecting ridges on said surface of the carrier sheet defining cells, and a cover film bonded to the ridges for sealing the prisms within the cells.

14. The retroreflective marker of claim 13 wherein each cell corresponds to one of said zones of prisms.

* * * * *

UNITED STATES PATENT AND TRADEMARK OFFICE
CERTIFICATE OF CORRECTION

PATENT NO. : 4,202,600
DATED : May 13, 1980
INVENTOR(S) : Thomas F. Burke and Donald H. Walker It is certified that error appears in the above—identified patent and that said Letters Patent is hereby corrected as shown below:

IN THE SPECIFICATION

Column 6, line 39, change "thereon" to -- therefrom --.

Signed and Sealed this

Twenty-first Day of October 1980

[SEAL]

Attest:

SIDNEY A. DIAMOND

Attesting Officer

Commissioner of Patents and Trademar.